United States Patent [19]

DeFever

[11] 4,301,955
[45] Nov. 24, 1981

[54] MODULAR PLATFORM AND CAMERA SUPPORT MOUNTING FOR RACING VEHICLE

[76] Inventor: Gene C. DeFever, 30-53 49th St., Astoria, N.Y. 11103

[21] Appl. No.: 108,026

[22] Filed: Dec. 28, 1979

[51] Int. Cl.³ .................. G03B 17/56; B60R 11/04
[52] U.S. Cl. ................................. 224/273; 354/293
[58] Field of Search .............. 224/273, 42.32, 908; 280/756, 760, 762, 769, 770; 354/293

[56] References Cited

U.S. PATENT DOCUMENTS 3,217,449 11/1965 Levere .......................... 224/273 X
3,752,376 8/1973 Shelton et al. ................. 354/293 X
3,774,519 11/1973 Johnson ........................... 354/293

Primary Examiner—Steven M. Pollard
Attorney, Agent, or Firm—Lilling & Greenspan

[57] ABSTRACT

A modular platform and camera support mounting for a racing vehicle is disclosed. The modular support may be made of a plurality of interconnected straight and curved tubular members. Tubular support struts may be attached to the straight and curved tubular members and to the chassis of the racing vehicle in order to support the modular support. Camera support platforms may be directly mounted on any one of the straight or curved tubular members, or they may be mounted or connected to upper vertical or lower vertical tubular supports mounted on the straight and curved tubular members. This invention provides for a plurality of different camera positions around the periphery of the racing vehicle.

10 Claims, 11 Drawing Figures

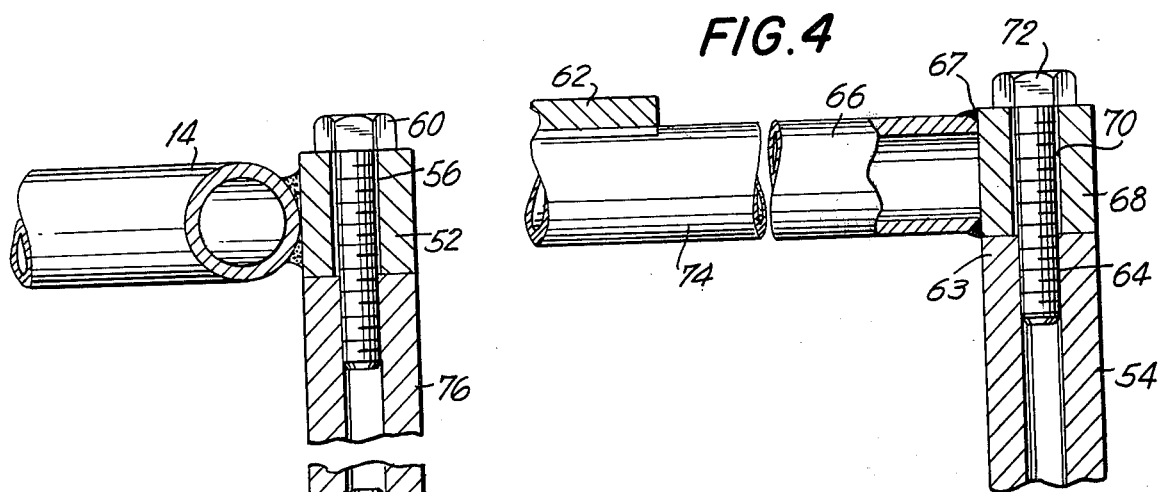
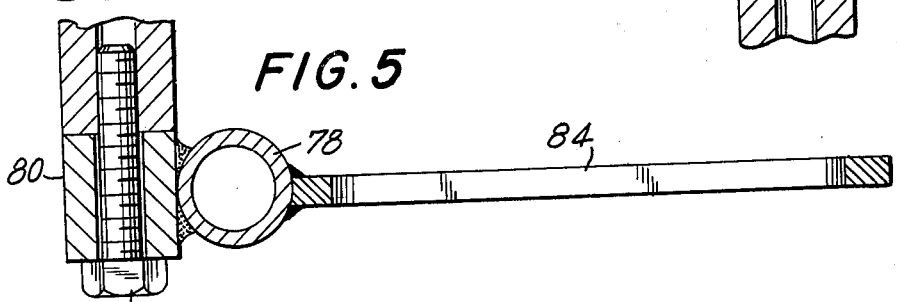
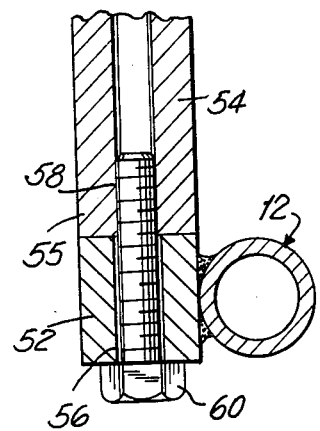
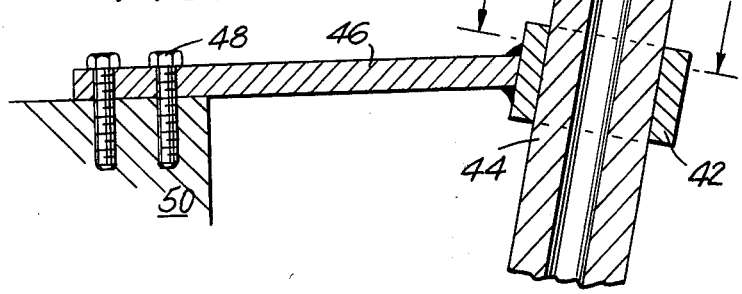
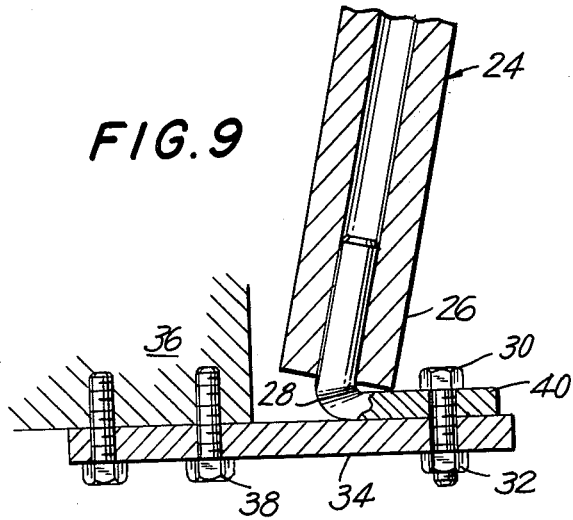
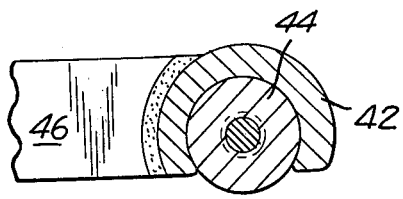

MODULAR PLATFORM AND CAMERA SUPPORT MOUNTING FOR RACING VEHICLE

BACKGROUND OF THE INVENTION

In recent years, photography has become a very sophisticated art form. Motion picture producers have been using increasingly sophisticated equipment to get even more realistic and spectacular visual effects. Many recent movies, such as "Jaws", have won wide acclaim for their very realistic photography. The photography in many recent movies is so realistic, in fact, that viewers of the movie are projected, almost literally, into the movie.

One of the fields which has been lagging somewhat behind the other areas of photography is the photography of auto races. A problem with getting realistic camera shots is that it has not been possible to effectively mount a camera on a racing car. Past attempts at doing so have proved to be ineffective. Perhaps the greatest obstacle has been the vibrations emanating from the race car, which have prevented a stable mounting of the camera. Further, there has not yet been designed any type of camera support for a racing car which can be moved in order to give different perspectives.

SUMMARY OF THE INVENTION

Therefore, it is an object of this invention to provide a new and unique support for a camera that may be used on a racing vehicle. This support will hold the camera steady and prevent excessive vibration of the camera. Moreover, the support structure includes a plurality of different locations at which the camera can be mounted, so that a plurality of camera mounting positions can be achieved.

The modular support structure is essentially rectangular or oval in shape and is fitted around the periphery of the racing vehicle. Tubular struts are used to attach the modular support structure to the racing vehicle. Because a lightweight material may be used for the modular support, the invention is easy to install and does not significantly interfere with the performance of the racing vehicle. Horizontally disposed plates can be positioned at various points along the modular structure and support mountings for cameras may be positioned on any of these plates. Thus, it is possible to achieve many different filming perspectives.

BRIEF DESCRIPTION OF THE DRAWINGS

FIG. 4 is a cross-sectional view taken substantially along the line 4—4 of FIG. 1, showing the manner in which tubular elements for supporting a platform are connected to the modular support;

FIG. 5 is a cross-sectional view taken substantially along the line 5—5 of FIG. 1, showing the manner in which a front camera support platform may be mounted on the modular support;

FIG. 6 is a cross-sectional view taken substantially along the line 6—6 of FIG. 1, showing the manner in which a vertical tubular member may be mounted on the modular support;

FIG. 7 is a cross-sectional view taken substantially along the line 7—7 of FIG. 1, showing the connection of a support tubular strut to the racing vehicle;

FIG. 8 is a cross-sectional view taken substantially along the line 8—8 of FIG. 7;

FIG. 9 is a cross-sectional view taken substantially along the line 9—9 of FIG. 1, showing the connection of the tubular support strut to the racing vehicle;

DETAILED DESCRIPTION OF THE INVENTION

Figure 1:
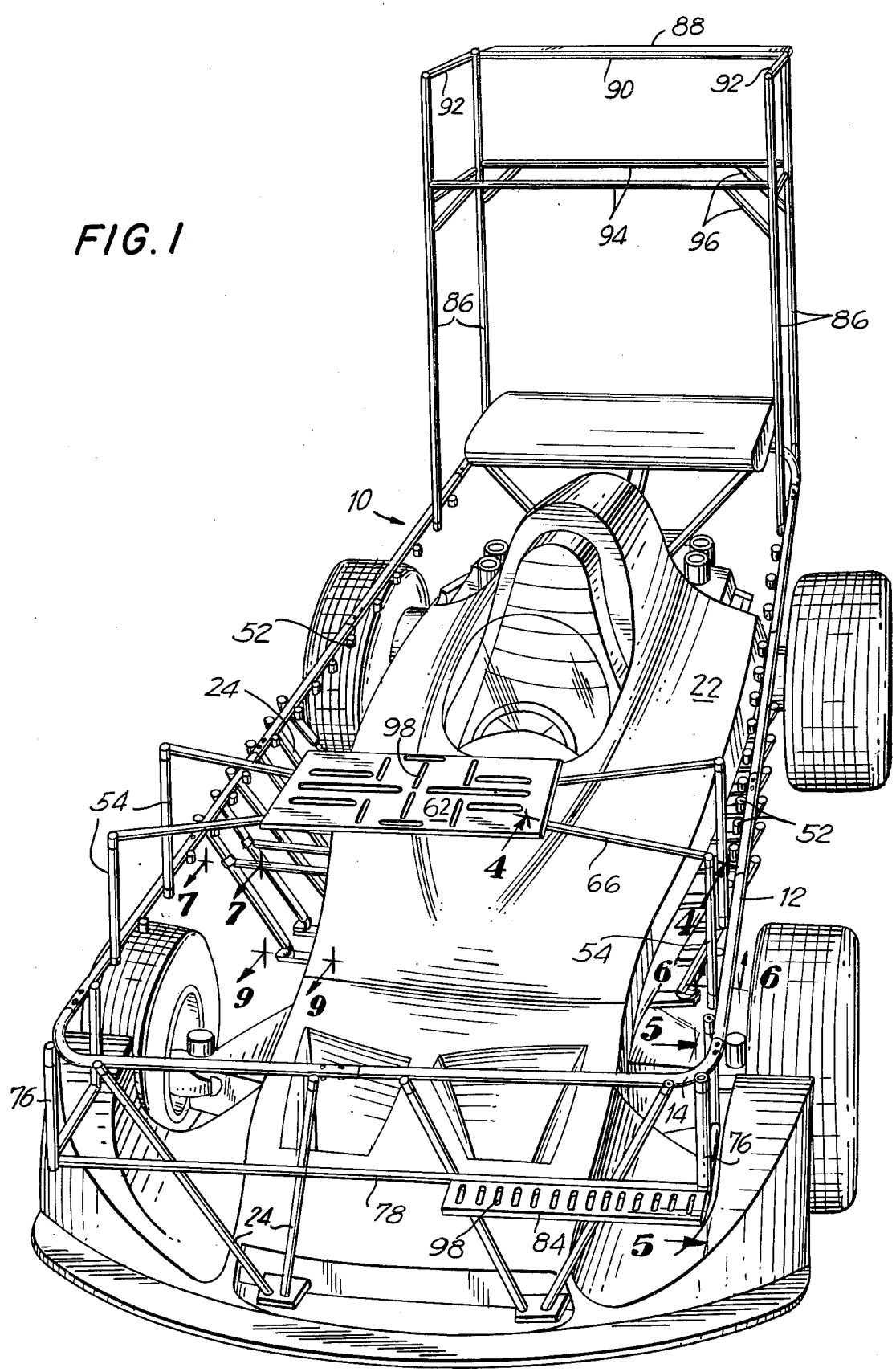
FIG. 1 is a perspective view showing the modular support affixed to a racing vehicle and showing platform supports positioned thereon.
Figure 2:
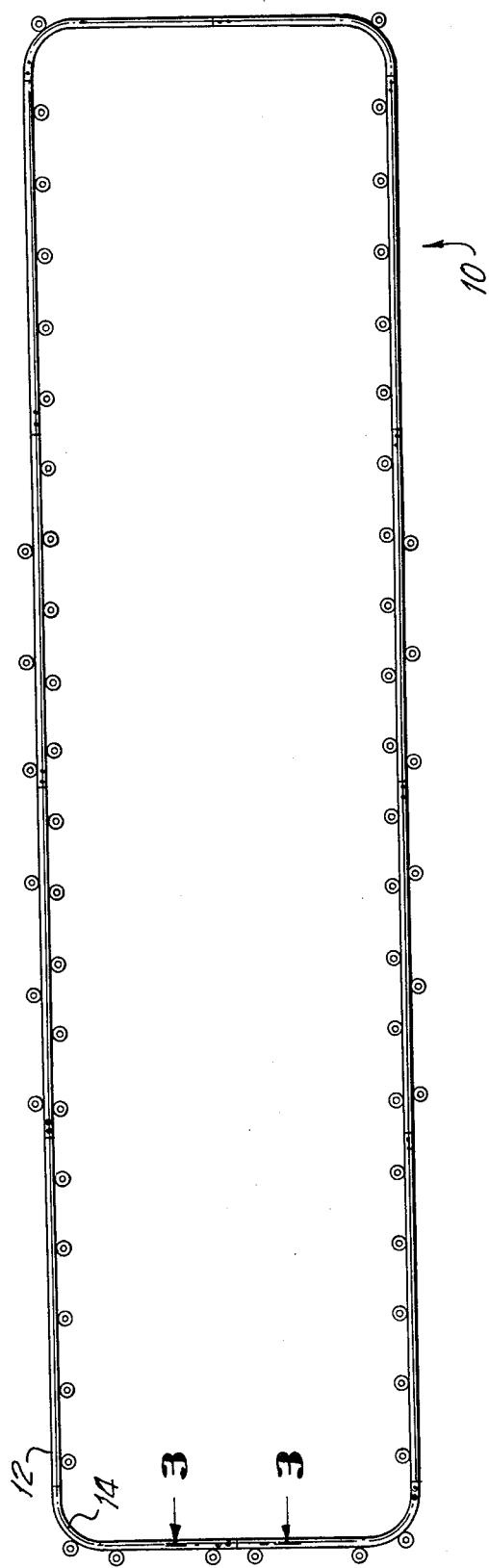
FIG. 2 is a top plan view of the modular support shown in FIG. 1.

Referring now to FIG. 1 and 2, a substantially rectangular or oval shaped modular support 10 is shown. A plurality of straight and curved tubular members 12 and 14 may be used to construct the modular support 10. If the modular support is made sufficiently wide, it is possible to insert one or more straight tubular members 12 between the curved tubular members 14 on each of the end portions of the modular support. Further, it is also possible to provide a modular support which does not extend around the entire periphery of the racing vehicle. In some situations, it may be desirable to only provide half or some other portion of the modular support. For instance, it may be desirable to only use the front half of the modular support, inasmuch as no camera shots from the rear portion of the vehicle are desired. Because the modular support consists of a plurality of straight and curved tubular members 12 and 14, it is relatively simple to add and subtract tubular members in order to get the desired modular support. One of the advantages of this invention is that the modular nature of the invention permits the use of either the entire modular support or just certain portions thereof. In the preferred embodiments (such as is shown in FIG. 1), the modular support 10 does not extend out beyond the very end of the tires of the automobile. Thus, the vehicle in question may be safely used during an actual auto race without any fear of it causing an accident among the racing vehicles.

Figure 3:
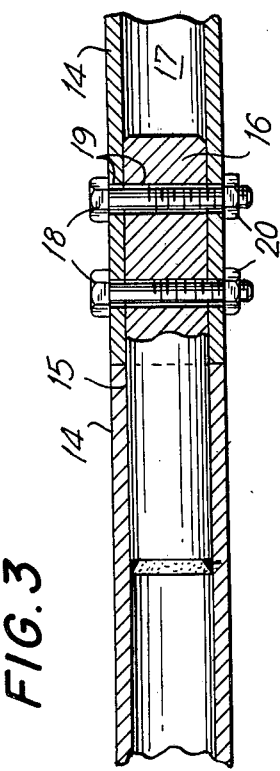
FIG. 3 is a cross-sectional view taken substantially along the line 3—3 of FIG. 2, showing a typical butt end construction.

FIG. 3 shows the manner in which two adjacent curved tubular members 14 are connected together. It must be pointed out that adjacent straight tubular members 12 may be attached in the same manner and a straight tubular member may be attached to a curved tubular member in the same manner. One of the tubular members (in this case the left-most curved tubular member 14) is provided with an extension 16 extending out from an open end 15. This extension 16 fits into the hollow interior 17 of the adjacent tubular member (in this case the right-most curved tubular member 14). Then, bolts 18, or other suitable means, are inserted through appropriate openings 19 in the tubular member and in the extension. Nuts 20 are then screwed on to the other end of the bolt to hold the entire assembly securely together. If desired, it is possible to similarly connect adjacent tubular members, where neither tubular member is provided with an extension 16. In such a case, a tubular like extension, which has an outside diameter smaller than the inside diameter of the tubular members, is placed into the opening of one of the tubular members. The opening of the other tubular member is then placed around the other end of the tubular extension. Bolt or screw means may then be used to attach each tubular member to the tubular extension, nuts being used to secure the assembly together. Further, there are other conventional ways to attach adjacent tubular members together. Any of these known constructions may be used with this invention.

As stated above, this invention is for use on racing vehicles or the like. Thus, the modular support 10 is provided with a plurality of tubular support struts 24 for attachment of the modular support to a racing vehicle 22. FIGS. 1 and 9 illustrate the manner in which the tubular struts 24 are secured to the racing vehicle 22. Extending outward from a lower end 26 of the tubular strut 24 is a connecting member 28. Preferably the connecting member 28 is L-shaped and is made integral with the lower end 26 of the tubular strut 24. By means of a threaded bolt 30 and a nut 32, or other suitable means, the connecting member 28 may be attached to a support plate 34. This support plate 34 is attached by any suitable means to the chasis 36 of the racing vehicle 22. In the embodiment shown in FIG. 9, threaded bolts 38 are used to attach the support plate 34 to the chasis 36. If desired, it is possible to directly connect the connecting member 28 to the chasis 36 of the racing vehicle. In such a case, it may be desirable to orient the connecting member 28 so that its distal end 40 extends toward the chasis, and not away from it. In some embodiments, the connecting member 28 may be attached directly to the shock absorbers of the automobile.

FIGS. 1, 7 and 8 show an optional additional support structure for the modular support 10. A bushing 42 may be fitted around a central region 44 of the tubular strut 24. A supporting plate 46 may then be suitably attached to the bushing 42, as by welding. By means of threaded bolts 48, or other suitable means, the supporting plate 46 can be attached to the fuselage 50 of the vehicle, or to some other rigid portion of the vehicle. The provision of this additional support structure may assist in stabilizing the entire modular support. It should be pointed out that such a support system need only be attached to a few of the tubular struts 24 in order to be effective. It is not necessary for all of the tubular struts 24 to have such a support structure.

A plurality of bushings 52 are spaced around the periphery of the modular support 10. Each of these bushings is essentially cylindrical in shape and they are attached to the straight and curved tubular members 12 and 14. Each of the bushings 52 has a central unthreaded channel 56. Preferably, each of the bushings is oriented so that the channel is essentially oriented in a vertical plane. Some of the bushings, however, will be oriented so that their central channel 56 is positioned at an angle to the vertical plane, so that they may be used for connecting the tubular struts 24 to straight or curved tubular members 12 and 14.

As is best shown in FIG. 6, the bushings 52 may be used to attach upper vertical tubular members 54 to respective tubular members. A distal end 55 of each of the upright tubular members 54 includes a threaded hole 58. To assemble the components together, the upright tubular member 54 is positioned essentially perpendicularly to the respective tubular member and the threaded hole 58 is aligned with the central channel 56 of the bushing 52. Then, a threaded bolt 60 may be inserted through the central channel and threaded into the hole 58. By such means, the upright tubular member 54 may be rigidly secured to the respective tubular member.

The upright tubular members 54 are spaced along the periphery of the modular support 10, so that they may hold or support one or more camera support platforms 62. Referring now to FIG. 4, the other distal end 63 of each of the upright tubular members 54 may be provided with a threaded hole 64. Attached to each of these upright tubular members 54 are tubular camera support members 66. Each of the tubular camera support members 66 may be provided with a bushing 68 at their outermost end 67. The bushing 68 is similar in construction to the bushing 52 and includes a central unthreaded channel 70. To assemble the tubular camera support member 66 to a respective upright tubular member 54, the tubular camera support member 66 should be set essentially perpendicularly to the upright tubular member 54 and the central channel 70 of the bushing 68 should be aligned with the threaded hole 64 at the end 63 of the upright tubular member 54. Then, a threaded bolt 72 may be passed through the central channel 70 and threaded into the hole 64. By such means, the tubular camera support member 66 and the upright tubular member 54 may be secured tightly together.

The other end 74 of the tubular camera support member 66 is suitably attached to the camera support platform 62, as by welding. Generally speaking, four tubular camera support members 66 are required to support a single camera support platform 62. If desired, it is possible to use fewer or more tubular camera support members.

In addition to using the bushings 52 for mounting upright tubular members 54 with respect to the tubular support 10, the same bushings 52 may be used for attaching lower vertical tubular members 76 which extend in a downward direction. Such tubular members 76 would be attached to the bushing 52 in the same manner as are the upright tubular members 54 (see FIG. 5).

At the front or rear end of the vehicle 22, if desired, the tubular members 76 may have a horizontal tubular member 78 rigidly connected between them, for added support of the entire structure. In the manner above described, a bushing 80 and a bolt 82 may be used for attaching the tubular member 76 to the horizontal tubular member 78.

If desired, a lower camera support platform 84 may be welded, or attached in any other suitable manner, to the horizontal tubular member 78. A camera support platform similar to support platform 84 may also be attached, as by welding, to any one of the straight or curved tubular members 12 and 14. Cameras mounted on support platforms attached to the straight tubular members 12 would be able to provide camera shots from the side of the fuselage or from the area surrounding one of the wheels of the vehicle. Such camera angles may be very desirable to film cars that are passing the camera vehicle.

If desired, upright tubular members 86 may be attached to the rear portion of the modular support 10. These tubular members may be somewhat longer than the upright tubular members 54, or possibly they could consist of several tubular members 54 connected together. The purpose of such upright tubular members 86 would be to support an upper camera support platform 88. Attached in the above described manner, a horizontal tubular member 90 may be attached to the back two upper tubular members 86 and tubular members 92 may rigidly connect the upright tubular members 86 on each side. In some cases, horizontal and/or diagonal support struts 94 and 96 may be required to support the structure. Generally speaking, the purpose of such an upper camera support platform 88 is to provide a camera angle looking down past the driver onto the raceway or back toward oncoming vehicles.

Figure 10:
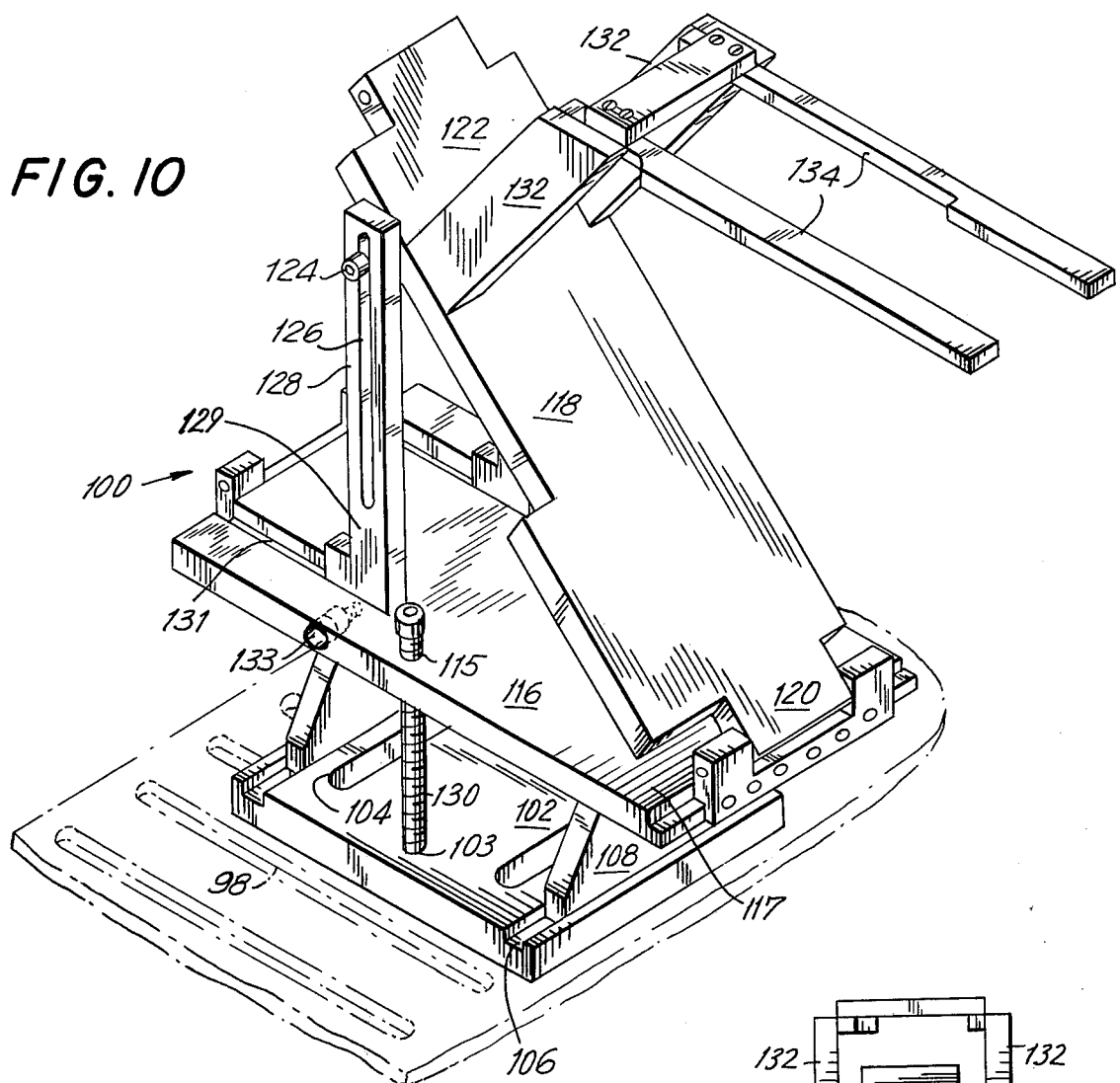
FIG. 10 is a perspective view of a camera support of this invention.
Figure 11:
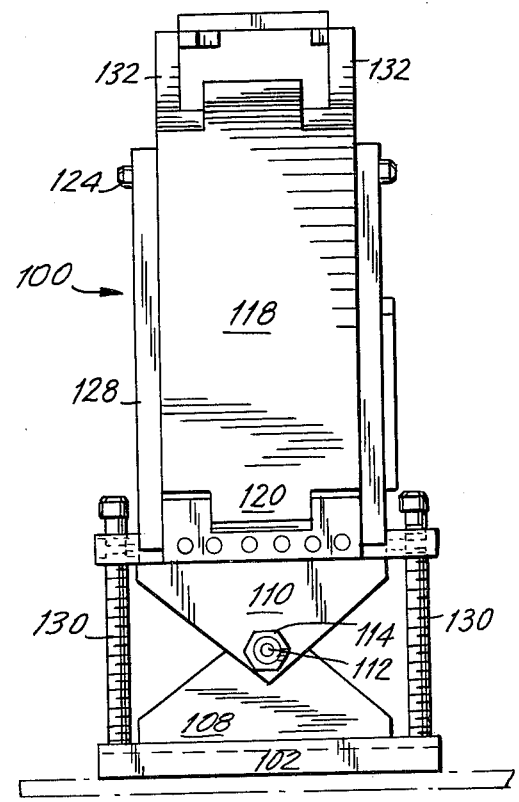
FIG. 11 is a front elevational view of the camera support showing in FIG. 10.

Each of the above mentioned camera support platforms (namely 62, 84 and 88) is provided with through openings or holes 98, so that a camera support 100 (illustrated in FIGS. 10 and 11) may be suitably attached to the camera support platform. Each of the camera supports 100 includes a base plate 102 with through openings 104. Bolts, or other suitable means, may be passed through these through openings 104 and into the through openings 98 in the respective camera support platform, in order to tightly secure the camera support 100 to the respective camera support platform.

The base plate 102 may be provided with grooves or channels 106 on its front and back ends. Lower supports 108 may be secured in these grooves 108. Pivotally connected to a respective lower support 108 is an upper support 110. One way to pivotally connect these two supports is to insert a bolt 112 through respective openings in the supports and attach a nut 114 to the far end of the bolt. When the nut is tightened, relative movement between the two supports would not be possible. Only when the nut was loosened, would it be possible for there to be relative movement between the supports. Mounted on the upper surfaces of the upper supports 110 is an upper base plate 116. A camera plate 118 is mounted on the upper base plate 116, so that it may be angled upwardly and downwardly. To accomplish this, the lower or front end 120 is pivotally connected to the front end 117 of the upper base plate 116. The upper or rear end 122 of the camera plate 118 includes stubs 124 slidingly movable in guides 126 of supports 128. The lower ends 129 of these supports 128 are pivotally mounted in slots 131 of the upper base plate 116. A locking screw 133 is provided to secure the supports 128 in any given angular position. In other words, by loosening the locking screw 133 the supports 128 may be rotated with respect to the upper base plate 116. This rotation of the supports 128 causes movement of the stubs 124 within the guides 126 and, consequently, pivoting of the camera plate 118. The grooves or guides 131 are provided to permit the supports 128 to rotate. When the camera plate 118 is in a position substantially parallel to the upper base plate 116, the supports 128 lie substantially completely within the grooves 131. After the correct angle of the camera plate 118 is selected, the locking screw 133 is engaged to secure the supports 128 in the desired position. Thus, a camera mounted on the camera plate 118 may be angled either upwardly or downwardly. By loosening the nut and bolt 112 and 114, the upper support 110 may be rotated, so that the camera can be tilted from side to side. Long threaded screws 130 may be inserted through an unthreaded hole 115 in the upper base plate 116 and threaded into a corresponding hole 103 on the lower base plate 102. By tightening or loosening the screws 130, the upper base plate 116, and thus the camera itself, may be angled with respect to a certain horizontal plane.

Extending perpendicularly away from the camera plate 118 are supports 132 with substantially perpendicularly mounted lateral supports 134. Generally speaking, the camera would be mounted directly onto the camera plate 118 and between the lateral supports 134.

To use the invention, one must first determine the position on the racing vehicle at which the camera is to be mounted. Because of the nature of the modular structure, it is possible to mount cameras at several different positions. After the desired positions are located, appropriate camera support platforms are then mounted. Onto each of these camera support platforms a camera support 100 would be positioned. Then, the camera itself would be positioned on the camera support. The cameramen would then appropriately adjust the camera support to get the desired angle of shooting for that camera. In other words, they would appropriately angle the camera plate 118 and tilt the upper base plate 116.

The camera itself can be activated in any one of several ways. It can be switched on just before the driver moves the racing vehicle away from the working area and be left on until he completes his run. Another way is to provide a cable from the camera to the cockpit. Then, the driver could turn the camera on and off for various periods. Further, it could be remote controlled.

One of the advantages of this invention is that it may be used on a typical racing vehicle. Therefore, it may be used during actual races without competing drivers worrying about a "slow" vehicle being on the track. Further, since the structure does not extend out beyond the normal sides or ends of the racing vehicle, there is no added danger of it causing collisions among the competing racing vehicles. Since the modular support is rather sleek, it does not obscure the view of drivers in vehicles behind or on the side of the camera vehicle.

In fact, the United States Auto Club has given its approval to permitting racing vehicles with the invention to be on the track during practice and qualifying runs. Further, the Sports Car Club of America has permitted the use of vehicles with this invention during qualifying and practice runs. Previously, camera vehicles were not permitted on the track during qualifying and practice runs because they presented too much of a danger to the racing vehicles. Thus, this invention constitutes a major breakthrough in racing photography.

I claim:

1. A modular platform and camera support mounting for racing vehicles comprising:
   a modular support comprising a plurality of interconnected straight and curved tubular members and attached to, and supported by, the racing vehicle;
   at least one camera support platform supported by said modular support; and
   at least one camera support mounted on a respective camera support platform and on which a camera is mounted, wherein said camera support comprises: a base plate mounted on a respective camera support platform; an upper base plate movably mounted on said base plate, said upper base plate being movable with respect to a plane parallel to a plane in which said base plane lies; a camera plate movably mounted on said upper base plate and on which said camera is mounted, said camera plate being movable with respect to a plane in which said upper base plate lies; lower supports mounted on said base plate; upper supports movably mounted with respect to a respective lower support; means for locking the position of an upper support with respect to said respective lower support; supports movably mounted on said upper base plate, stubs on a first end of said camera plate being movable within guides on said supports and a second end of said camera plate being movably mounted on a front end of said upper base plate; and, retaining means attached to said camera plate to align a camera on said camera plate;

wherein said upper base plate may be tilted from side to side, and said camera plate may be angled upwardly and downwardly.

2. A modular platform and camera support mounting according to claim 1, wherein each tubular member includes a first end with an opening and a second end from which an extension projects outwardly, said extension of a respective tubular member fitting into said opening on said first end of an adjacent tubular member, and threaded bolts and nuts securing said extension to said adjacent tubular member.

3. A modular platform and camera support mounting according to claim 1, wherein each tubular member has an opening on each of its ends; and tubular extensions are fitted into said openings on said ends of adjacent tubular members, threaded bolts and nuts securing said extension to said adjacent tubular members.

4. A modular platform and camera support mounting according to claim 1, wherein at least one of said camera support platforms is mounted on a respective tubular member.

5. A modular platform and camera support mounting according to claim 1, further comprising a plurality of upper vertical tubular members mounted substantially perpendicularly to respective tubular members; and wherein at least one of said camera support platforms is connected to one or more upper vertical tubular members.

6. A modular platform and camera support mounting according to claim 5, further comprising a plurality of bushings mounted on respective tubular members, each bushing having a central unthreaded channel; and wherein a first end of each upper vertical tubular member includes a threaded hole, and a threaded bolt is passed through said central channel of a respective bushing and threaded into said threaded hole of an adjacent upper vertical tubular member.

7. A modular platform and camera support mounting according to claim 6, further comprising at least one tubular camera support member on which said camera support platforms are mounted; and a plurality of bushings mounted on a second end of each tubular camera support member, each bushing having a central unthreaded channel; and wherein a second end of each upper vertical tubular member includes a threaded hole, and a threaded bolt is passed through said central channel of a respective bushing and threaded into said threaded hole of an adjacent upper vertical tubular member.

8. A modular platform and camera support mounting according to claim 1, further comprising a plurality of tubular support struts having a first end connected to said racing vehicle and a second end connected to a respective tubular member.

9. A modular platform and camera support mounting according to claim 8, further comprising a plurality of bushings mounted on respective tubular members, each bushing having a central unthreaded channel; and wherein said second end of each tubular support strut includes a threaded hole, and a threaded bolt is passed through said central channel of a respective bushing and threaded into said threaded hole of an adjacent tubular support strut.

10. A modular platform and camera support mounting according to claim 9, further comprising a bushing affixed around a middle region of each tubular support strut; and a supporting plate having a first end attached to said bushing on said middle region of said tubular support strut, and a second end attached to said racing vehicle.

* * * * *